United States Patent
Song et al.

(10) Patent No.: US 10,893,441 B2
(45) Date of Patent: Jan. 12, 2021

(54) RTS/CTS HANDSHAKING METHOD FOR IMPROVING EFFICIENCY OF COMMUNICATION RESOURCES

(71) Applicant: Korea Advanced Institute of Science and Technology, Daejeon (KR)

(72) Inventors: Nah Oak Song, Daejeon (KR); Jun Hyuk Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 43 days.

(21) Appl. No.: 15/506,220

(22) PCT Filed: Sep. 18, 2015

(86) PCT No.: PCT/KR2015/009825
§ 371 (c)(1),
(2) Date: Feb. 23, 2017

(87) PCT Pub. No.: WO2016/043551
PCT Pub. Date: Mar. 24, 2016

(65) Prior Publication Data
US 2018/0220333 A1  Aug. 2, 2018

(30) Foreign Application Priority Data

Sep. 18, 2014 (KR) .................. 10-2014-0124135
Mar. 23, 2015 (KR) .................. 10-2015-0040038

(51) Int. Cl.
*H04W 28/16* (2009.01)
*H04W 74/08* (2009.01)
(Continued)

(52) U.S. Cl.
CPC .......... *H04W 28/16* (2013.01); *H04W 28/02* (2013.01); *H04W 74/0808* (2013.01); *H04W 74/0816* (2013.01); *H04W 88/023* (2013.01)

(58) Field of Classification Search
CPC . H04W 28/16; H04W 74/0808; H04W 28/02; H04W 88/023
See application file for complete search history.

(56) References Cited

U.S. PATENT DOCUMENTS

| 8,274,961 B2 * | 9/2012 | Sakoda | H04W 74/0816 370/328 |
| 2005/0105504 A1 * | 5/2005 | Sakoda | H04L 1/0002 370/349 |

(Continued)

FOREIGN PATENT DOCUMENTS

| JP | 20077129423 | 5/2007 |
| KR | 20110058710 | 6/2011 |

*Primary Examiner* — Peter P Chau
(74) *Attorney, Agent, or Firm* — Ferguson Case Orr Paterson (57) ABSTRACT

Disclosed is an RTS/CTS handshaking method for improving the efficiency of wireless communication resources. An RTS/CTS handshaking method according to one example of the present invention comprises the steps of: if a Ready to Send (RTS) packet is received, setting a first Network Allocation Vector (NAV) during a predetermined Clear to Send (CTS) packet transmission period; and if the CTS packet is received, setting a second NAV during a predetermined data packet transmission period.

2 Claims, 10 Drawing Sheets

(51) Int. Cl.
   *H04W 28/02*   (2009.01)
   *H04W 88/02*   (2009.01)

(56) References Cited

U.S. PATENT DOCUMENTS

| | | | |
|---|---|---|---|
| 2006/0209712 A1* | 9/2006 | Morioka | H04L 1/0025 370/252 |
| 2007/0133489 A1* | 6/2007 | Ramesh | H04W 74/0866 370/338 |
| 2007/0177534 A1* | 8/2007 | Chen | H04W 52/0225 370/311 |
| 2008/0232335 A1* | 9/2008 | Del Prado Pavon | H04W 74/0808 370/338 |
| 2014/0071959 A1* | 3/2014 | Ghosh | H04W 72/0446 370/336 |
| 2015/0063233 A1* | 3/2015 | Choi | H04W 52/0216 370/329 |
| 2015/0365972 A1* | 12/2015 | Seok | H04B 7/0452 370/336 |
| 2017/0027001 A1* | 1/2017 | Choi | H04W 74/0816 |

* cited by examiner

FIG. 1

PRIOR ART

RTS/CTS HANDSHAKING METHOD FOR IMPROVING EFFICIENCY OF COMMUNICATION RESOURCES

TECHNICAL FIELD

Embodiments of the inventive concepts described herein relate to communication systems, and more particularly, relate to a ready to send/clear to send (RTS/CTS) handshaking method for optimizing usage efficiency of communication resources in an RTS/CTS handshaking process used in a distributed medium access control (MAC) protocol.

BACKGROUND ART

With the development of information and communication technologies, various wireless communication technologies have been developed. A wireless local area network (WLAN) among the various wireless communication technologies may be technology of wirelessly accessing the Internet at home, an enterprise, or a specific service providing area using a portable terminal, such as a personal digital assistant (PDA), a laptop computer, or a portable multimedia player (PMP), based on wireless technologies based on a distributed MAC protocol.

A communication system may be classified as centralized communication or distributed communication based on whether there is an entity which oversees communication of its terminal.

In the centralized communication, a node which is the center ascertains and addresses everything. However, in the distributed communication, since each of nodes ascertains its situation and the nodes communicate with each other, many MAC protocols for the distributed communication have been researched.

Particularly, in a carrier sensing multiple access with collision avoidance (CSMA/CA) MAC protocol such as an institute of electrical and electronics engineers (IEEE) 802.11 distributed coordinate function (DCF) which is a distributed MAC protocol which is widely used in a wireless network, a request to send or ready to send/clear to send (RTS/CTS) method is proposed to address a hidden node problem which occurs due to a transmission range limit of a node in a wireless communication system. Herein, the proposed RTS/CTS method has a problem which causes waste by setting a network allocation vector (NAV) if an RTS packet or a CTS packet is not correctly received. The prosed RTS/CTS method causes an exposed terminal or node problem which reduces utilization of channels.

An RTS/CTS handshaking method for addressing the hidden node problem may be widely used in wired communication systems such as recommended standard 232 (RS-232) communication and power line communication as well as wireless communication systems such as IEEE 802.11 and IEEE 802.15.4.

Technical Problem

Embodiments of the inventive concepts provide an RTS/CTS handshaking method for preventing resources from being wasted by setting a network allocation vector (NAV) although an RTC packet or a CTS packet is not correctly received in a conventional RTS/CTS method.

Embodiments of the inventive concepts provide an RTS/CTS handshaking method for optimizing usage efficiency of wireless or wired communication resources by minimizing exposed nodes generated by RTS/CTS handshaking.

Embodiments of the inventive concepts provide an NAV setting mechanism for optimizing usage efficiency of communication resources.

Technical Solution

According to an aspect of an embodiment, an RTS/CTS handshaking method may include setting a first network allocation vector (NAV) during a CTS packet transmission period, if an RTS packet is received and setting a second NAV during a data packet transmission period, if a CTS packet is received.

The method may further include setting a third NAV during an acknowledge (ACK) packet transmission period, if a data packet is received.

The setting of the first NAV may include setting the first NAV, if a terminal is located within a communication range of a first terminal which transmits the RTS packet. The setting of the second NAV may include setting the second NAV, if the terminal is located within a communication range of a second terminal which transmits the CTS packet.

According to another aspect of an embodiment, an RTS/CTS handshaking method may include detecting whether any one of a control packet or a data packet is received and, if the any one of the control packet or the data packet is received, setting an NAV during a packet transmission period subsequent to the received packet.

The setting of the NAV may include setting a first NAV only during a CTS packet transmission period, if the received packet is an RTS packet. The setting of the NAV may include setting the first NAV, if a terminal is located within a communication range of a first terminal which transmits the RTS packet.

The setting of the NAV may include setting a second NAV only during a data packet transmission period, if the received packet is a CTS packet. The setting of the NAV may include setting the second NAV, if a terminal is located within a communication range of a second terminal which transmits the CTS packet.

The setting of the NAV may include setting a third NAV only during an ACK packet transmission period, if the received packet is a data packet.

According to another aspect of an embodiment, a terminal may include a detecting unit configured to detect whether any one of a control packet or a data packet is received and, if the any one of the control packet or the data packet is received, a setting unit configured to set an NAV during a packet transmission period subsequent to the received packet.

The setting unit may set a first NAV only during a CTS packet transmission period, if the received packet is an RTS packet. The setting unit may set the first NAV, if the terminal is located within a communication range of a first terminal which transmits the RTS packet.

The setting unit may set a second NAV only during a data packet transmission period, if the received packet is a CTS packet. The setting unit may set the second NAV, if the terminal is located within a communication range of a second terminal which transmits the CTS packet.

The setting unit may set a third NAV only during an ACK packet transmission period, if the received packet is a data packet.

Advantageous Effects

Embodiments of the inventive concept may prevent resources from being wasted by setting an NAV although an RTC packet or a CTS packet is not correctly received in a conventional RTS/CTS method.

Further, embodiments of the inventive concept may minimize exposed nodes generated by RTS/CTS handshaking and may optimize usage efficiency of communication resources by receiving a control packet or a data packet and setting an NAV only during a predetermined packet transmission period subsequent to the received packet.

Embodiments of the inventive concept may be applied to standards of a wired communication system as well as standards of various wireless communication systems such as IEEE 802.11 and IEEE 802.15 and may be applied to a universal communication system which is not standards.

BEST MODE

Hereinafter, a description will be given in detail of embodiments according to the inventive concept with reference to the accompanying drawings. However, the inventive concept is not limited by embodiments. Also, like reference denotations shown in each drawing refer to like members.

Embodiments of the inventive concept may minimize exposed nodes generated by RTS/CTS handshaking and may optimize usage efficiency of communication resources by setting an NAV only during a predetermined transmission period based on a received packet at exposed nodes exposed in a communication range in which a sender transmits a control packet and a data packet and a communication range in which a receiver transmits a control packet, when a packet is transmitted and received between the sender and the receiver.

Herein, exposed nodes generated by RTS/CTS handshaking may be minimized by setting an NAV only during a CTS packet transmission period at exposed nodes which receive an RTS packet, setting an NAV only during a data packet transmission period at exposed nodes which receive a CTS packet, and setting an NAV only during an acknowledge (ACK) packet transmission period at exposed nodes which receive a data packet.

Since an RTS/CTS handshaking method according to an embodiment of the inventive concept is performed without correcting specifications of a communication system, it may be applied to standards of a wired communication system as well as standards of various wireless communications, such as institute of electrical and electronics engineers (IEEE) 802.11 and IEEE 802.15. In addition, the RTS/CTS handshaking method may be applied to a universal communication system which is not standards.

Figure 1:
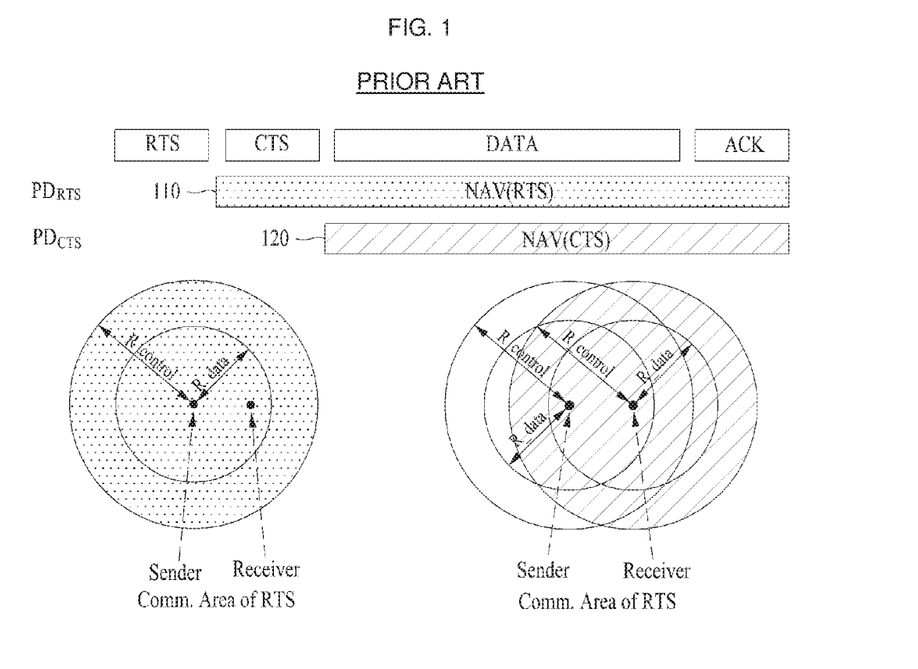
FIG. 1 is an exemplary drawing illustrating conventional RTS/CTS handshaking.

FIG. 1 is an exemplary drawing illustrating conventional RTS/CTS handshaking.

Briefly describing a process of transmitting and receiving a packet between a sender and a receiver, the sender may transmit an RTS packet and the receiver may transmit a CTS packet to the RTS packet. If the transmission and reception of the RTS packet and the CTS packet is completed, the sender may transmit a data packet to the receiver and the receiver may transmit an ACK packet in response to receiving the data packet.

A description will be given of the conventional RTS/CTS handshaking method with reference to FIG. 1.

As shown in the left drawing of FIG. 1, if the sender transmits an RTS packet $PD_{RTS}$ to the receiver, exposed nodes located within a communication range of a control packet of the sender may receive the RTS packet and may set an NAV(RTS) 110 during a predetermined transmission period for the RTS packet, that is, from a CTS packet transmission period to an ACK packet transmission period, thus delaying transmitting the CTS packet during the NAV (RTS) 110.

As shown in the right drawing of FIG. 1, if the receiver receives the RTS packet sent from the sender and transmits a CTS packet to the RTS packet to the sender, exposed nodes located within a communication range of a control packet of the receiver may receive the CTS packet and may set an NAV(CTS) 120 during a predetermined transmission period for the CTS packet, that is, a data packet transmission period to the ACK packet transmission period, thus delaying transmitting the data packet during the NAV(CTS) 120.

As known in FIG. 1, the conventional RTS/CTS handshaking method may include terminals or nodes, located within the communication range of the control packet of the sender during the CTS packet transmission period, as exposed nodes and may include terminals, located within the communication range of the control packet of the sender and the communication range of the control packet of the receiver during the data packet transmission period and the ACK packet transmission period, as exposed nodes.

Therefore, the conventional RTS/CTS handshaking method may generate all of terminals, located within the communication range of the control packet of the sender and the communication range of the control packet of the receiver, as exposed nodes, thus reducing usage efficiency of wireless resources.

A description will be given of the concept of the communication range described with reference to FIG. 1, with reference to FIGS. 2 to 4.

Figure 2:
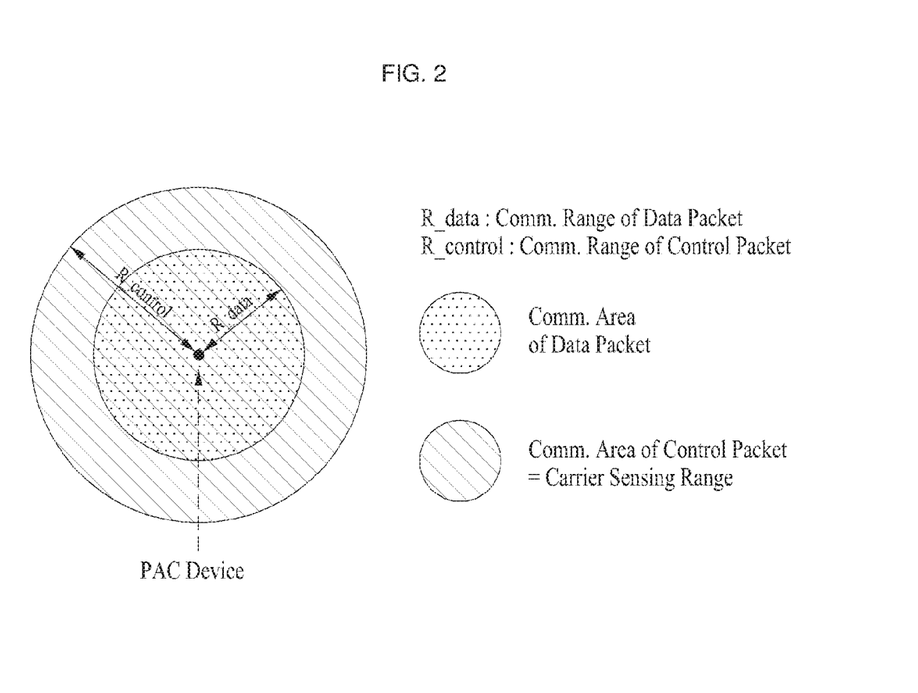
FIG. 2 is an exemplary drawing illustrating the concept of a communication range used in the inventive concept.

FIG. 2 is an exemplary drawing illustrating the concept of a communication range used in the inventive concept.

As shown in FIG. 2, a PAC (Peer Aware Communication) device which receives a control packet or a data packet, for example, a terminal, an access point (AP), or the like may have a communication range R_control of the control packet and a communication range R_data of the data packet.

The communication range R_control of the control packet may refer to a communication range where the control packet such as an RTS packet, a CTS packet, or an ACK packet may be transmitted. The communication range R_data of the data packet may refer to a communication range where the data packet may be transmitted.

In this case, since a transmission rate of the control packet is slower than a transmission rate of the data packet, the communication range R_control of the control packet may be regarded as being wider than the communication rage R_data of the data packet.

The communication range R_control of the control packet may be the same as a carrier sensing range.

Figure 3:
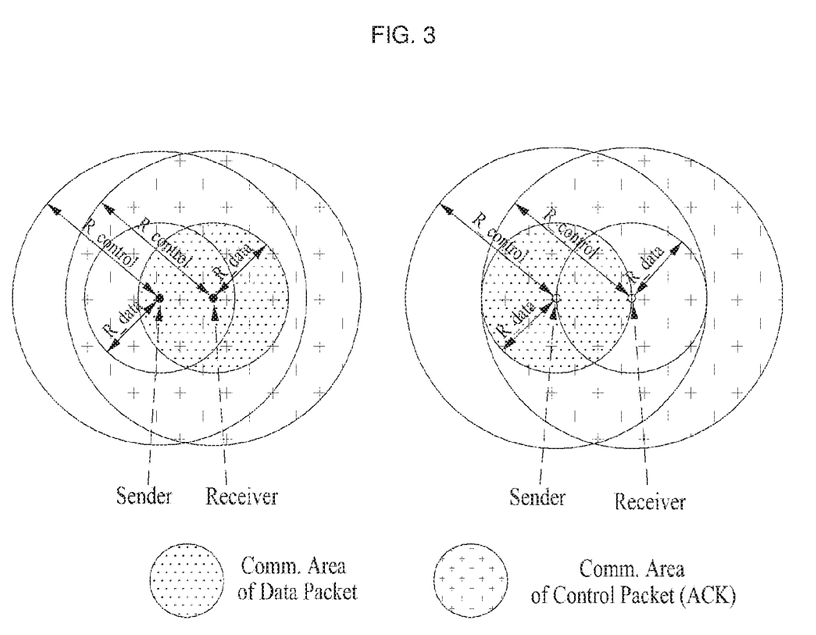
FIG. 3 is an exemplary drawing illustrating a communication range if a sender and a receiver are close to each other.

FIG. 3 is an exemplary drawing illustrating a communication range if a sender and a receiver are close to each other.

As shown in FIG. 3, a communication range of a data packet may vary according to a transmission rate of the data packet. When the transmission rate of the data packet is quicker, the communication range of the data packet may be shorter or narrower.

In case of the left drawing of FIG. 3, although a communication range of a data packet of a sender is narrow because a transmission rate of the data packet is fast, since the sender and a receiver are sufficiently close to each other, the receiver may be located within the communication range of the data packet of the sender. In contrast, in case of the right drawing of the FIG. 3, since a communication range of a data packet of the sender is narrow as a transmission rate of a data packet is fast, although the sender and the receiver are away a little from each other, the receiver may depart from the communication range of the data packet of the sender.

Figure 4:
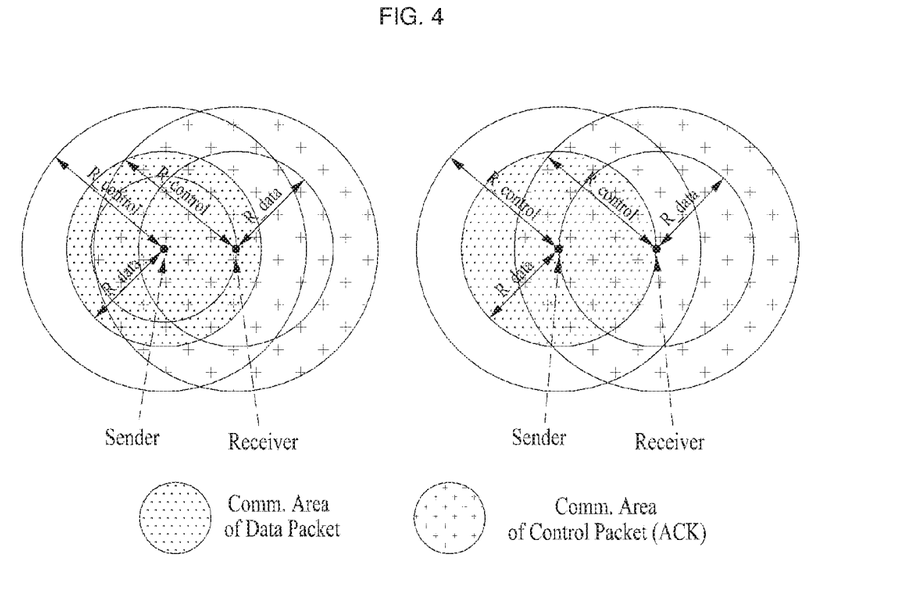
FIG. 4 is an exemplary drawing illustrating a communication range if a sender and a receiver are not close to each other.

FIG. 4 is an exemplary drawing illustrating a communication range if a sender and a receiver are not close to each other.

As shown in FIG. 4, since a transmission rate of a data packet is slower than that of a data packet shown in FIG. 3, a communication range of the data packet may be wider or longer than that of the data packet shown in FIG. 3.

In other words, since a transmission rate of a data packet of a sender is not fast, as shown in the left drawing of FIG. 4, although a receiver is away to some degree from the sender, the receiver may be located within a communication range of the data packet of the sender. Of course, as shown in the right drawing of FIG. 4, if the receiver is far away from the sender, it may depart from a communication range of the data packet of the sender.

Figure 5:
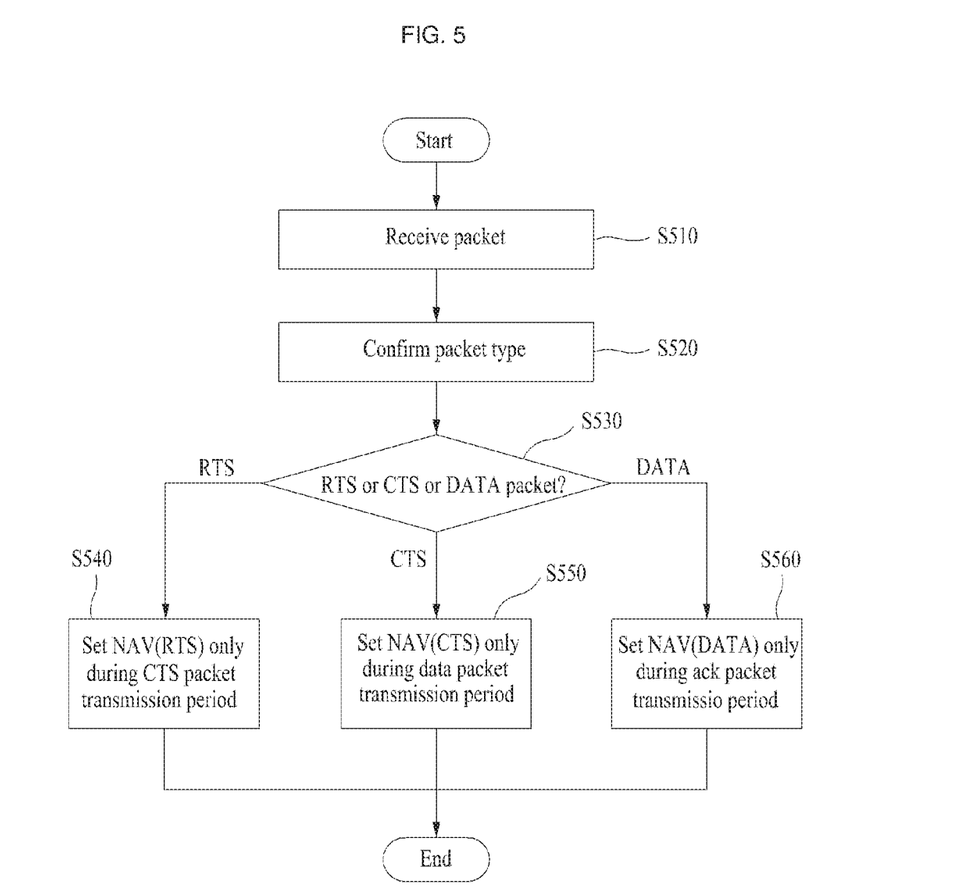
FIG. 5 is a flowchart illustrating an RTS/CTS handshaking method according an embodiment of the inventive concept.

FIG. 5 is a flowchart illustrating an RTS/CTS handshaking method according an embodiment of the inventive concept and is a flowchart illustrating exposed nodes located within a communication range of a control packet or a data packet. Of course, the method according to an embodiment of the inventive concept may be applied to a sender and a receiver as well as exposed nodes.

Referring to FIG. 5, the RTS/CTS handshaking method according to an embodiment of the inventive concept may include steps S510 and S520 of receiving a packet and verifying a type of the received packet and steps S530 and S560 of setting an NAV in a different way based on the verified type of the packet.

The step S530 may be a process of determining whether the received packet is any one of an RTS packet, a CTS packet, and a data packet. The steps S540 to S560 may be processes of setting each of NAVs as the determined packet is the RTS packet, the CTS packet, or the data packet.

In this case, if a corresponding terminal is located within a communication range of a control packet of a sender which sends an RTS packet or a communication range of a data packet of the sender which sends the data packet, the steps S530 to S560 of setting each of the NAVs may set an NAV(RTS) or an NAV(data) during a subsequent packet transmission period. If the corresponding terminal is located within a communication range of a control packet of a receiver which transmits a CTS packet, the steps S530 to S560 of setting each of the NAVs may set an NAV(CTS) during a subsequent packet transmission period.

This method according to an embodiment of the inventive concept will be described in detail with reference to FIGS. 6 to 9.

Figure 6:
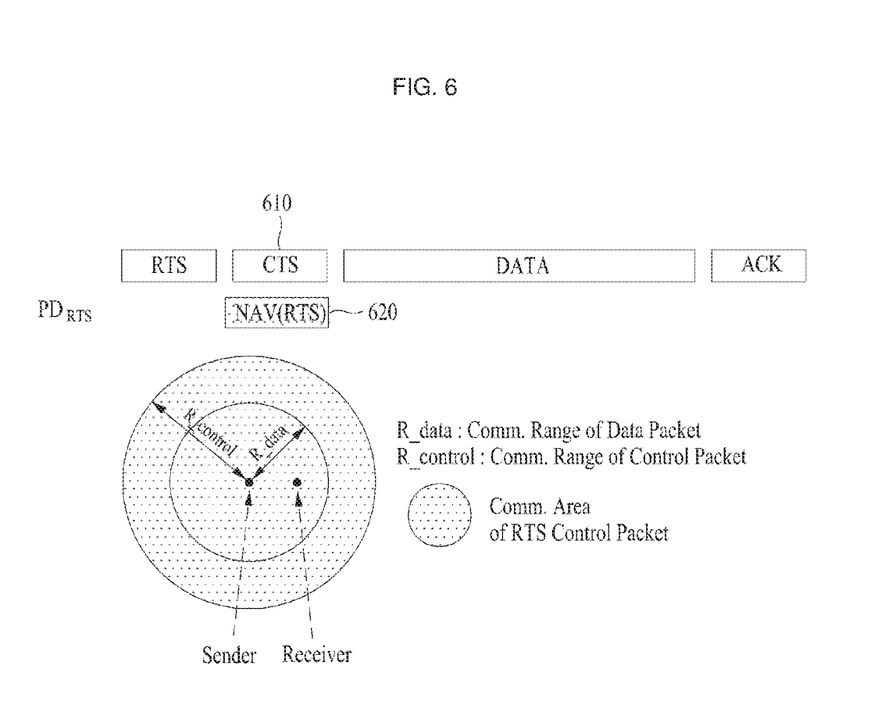
FIG. 6 is an exemplary drawing illustrating NAV setting of exposed nodes which are within a communication range of an RTS packet.

FIG. 6 is an exemplary drawing illustrating NAV setting of exposed nodes which are within a communication range of an RTS packet and generated exposed nodes.

Referring to FIG. 6, if a sender sends an RTS packet $PD_{RTS}$ to a receiver, exposed nodes located within a communication range of the RTS packet of the sender may receive the RTS packet.

Each of the exposed nodes located within the communication range of the control packet of the sender may receive the RTS packet and may set an NAV(RTS) 620 only during a CTS packet transmission period 610.

In this case, the communication range R_control of the RTS packet may refer to a communication packet of a control packet such as an RTS packet, a CTS packet, or an ACK packet.

Figure 7:
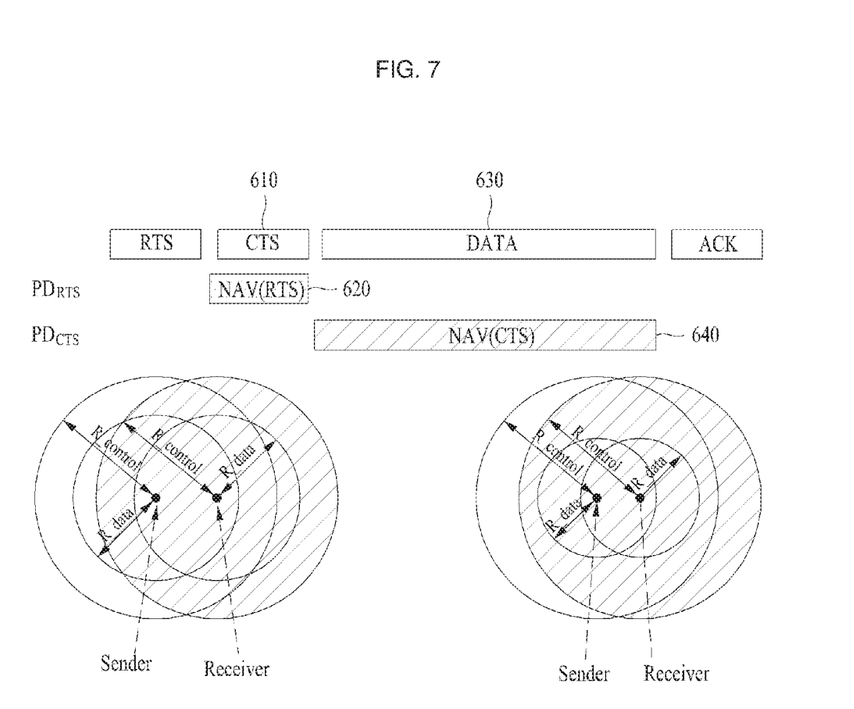
FIG. 7 is an exemplary drawing illustrating NAV setting of exposed nodes which are within a communication range of a CTS packet.

FIG. 7 is an exemplary drawing illustrating NAV setting of exposed nodes which are within a communication range of a CTS packet and generated exposed nodes and illustrates that a transmission rate of a data packet is slow (the left drawing) and is fast (the right drawing).

Referring to FIG. 7, if a receiver which receives an RTS packet transmits a CTS packet $PD_{CTS}$ to the RTS packet, exposed nodes located within a communication range R_control of the CTS packet may receive the CTS packet.

Each of exposed nodes located within a communication range of a control packet of the receiver may receive the CTS packet and may set an NAV(CTS) 640 only during a data packet transmission period 630.

In this case, the communication range R_control of the CTS packet may refer to the communication range of the control packet, such as an RTS packet, a CTS packet, or an ACK packet, of the receiver.

As known in FIG. 7, nodes which are located within a communication range of a control packet of the sender and are located out of the communication range of the control packet of the receiver do not set an NAV during the data packet transmission period 630. Therefore, exposed nodes generated during the data packet transmission period 630 may be reduced, and usage efficiency of wireless resources may be increased.

Figure 8:
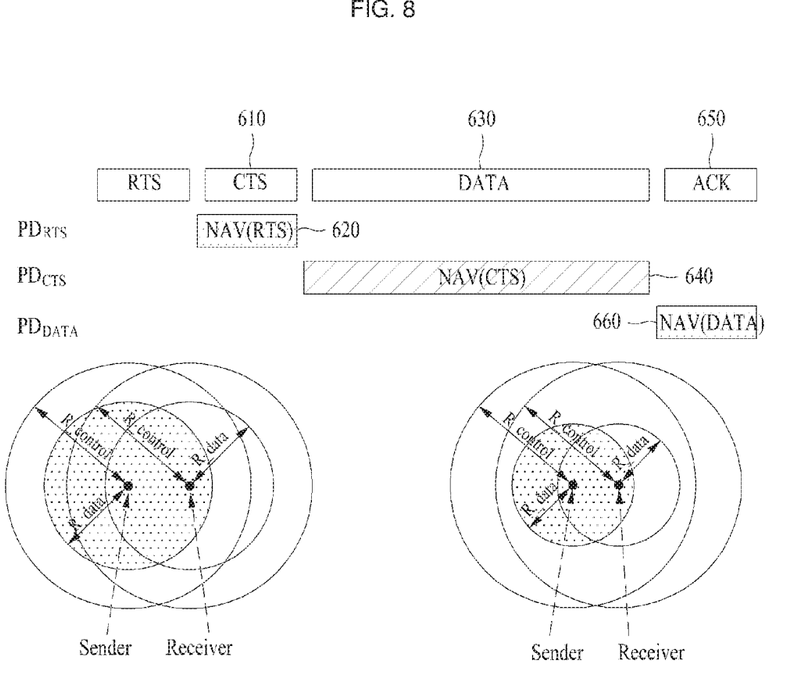
FIG. 8 is an exemplary drawing illustrating NAV setting of exposed nodes which are within a communication range of a data packet.

FIG. 8 is an exemplary drawing illustrating NAV setting of exposed nodes which are within a communication range of a data packet and generated exposed nodes and illustrates that a transmission rate of a data packet is slow (the left drawing) and is fast (the right drawing).

Referring to FIG. 8, if a sender which receives a CTS packet transmits a data packet $PD_{DATA}$, exposed nodes located within a communication rage R_data of a data packet of the sender may receive the data packet.

Each of the exposed nodes located within the communication range of the data packet of the sender may receive the data packet and may set an NAV(DATA) 660 only during an ACK packet transmission period 650.

Herein, nodes which are located within a communication range of a control packet of a receiver and are located out of the communication range of the data packet of the sender do not set an NAV during the ACK packet transmission period 650. Therefore, exposed nodes generated during the ACK packet transmission period 650 may be reduced to increase usage efficiency of wireless resources.

Of course, if a transmission rate of a data packet is fast, since a communication range of the data packet is narrower than if the transmission rate of the data packet is slow, generated exposed nodes may be more reduced.

Figure 9:
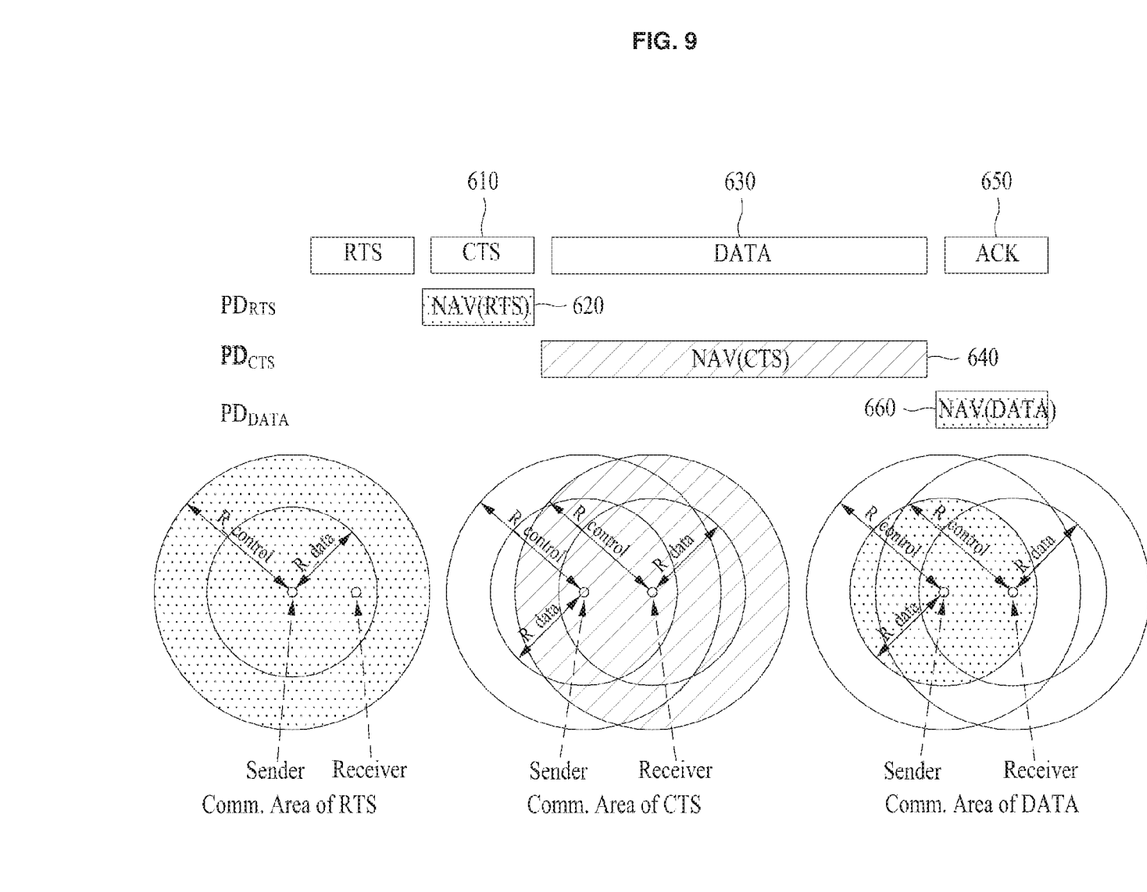
FIG. 9 is an exemplary drawing illustrating NAV setting of exposed nodes based on packet transmission and reception between a sender and a receiver.

FIG. 9 is an exemplary drawing illustrating NAV setting of exposed nodes based on packet transmission and reception between a sender and a receiver and generated exposed nodes.

Referring to FIG. 9, as shown in the left drawing of FIG. 9, if the sender transmits an RTS packet, only nodes located within a communication range of a control packet of the sender are exposed nodes. Each of the exposed nodes may receive the RTS packet and may set an NAV(RTS) 620 only during a CTS packet transmission period 610.

As shown in the middle drawing of FIG. 9, if the receiver transmits a CTS packet, only nodes located within a communication range of a control packet of the receiver may be exposed nodes. Each of the exposed nodes may receive the CTS packet and may set an NAV(CTS) 640 only during a data packet transmission period 630. In other words, nodes which are located within the communication range of the control packet of the sender and are located out of the communication range of the control packet of the receiver may depart from exposed nodes.

As shown in the right drawing of FIG. 9, if the sender transmits a data packet, only nodes located within a communication range of a data packet of the sender may be exposed nodes. Each of the exposed nodes may receive the data packet and may set an NAV(DATA) 660 only during an ACK packet transmission period 650. In other words, nodes which are located within the communication range of the control packet of the receiver and are located out of the communication range of the data packet of the sender may depart from exposed nodes.

As such, the RTS/CTS handshaking method according to an embodiment of the inventive concept may minimize exposed nodes and may optimize usage efficiency of wireless resources by setting an NAV only during a packet transmission period subsequent to a received control packet or a received data packet.

In an embodiment of the inventive concept, an NAV value set by each of exposed nodes may be included in a received control packet or a received data packet. An NAV setting value and a setting period according to a packet type may be previously stored in each of exposed nodes depending on a situation.

Figure 10:
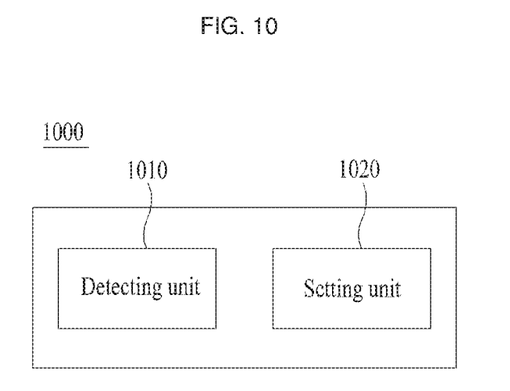
FIG. 10 is a block diagram illustrating a configuration of a terminal according to an embodiment of the inventive concept.

FIG. 10 is a block diagram illustrating a configuration of a terminal according to an embodiment of the inventive concept.

Referring to FIG. 10, a terminal 1000 according to an embodiment of the inventive concept may be a terminal to which an RTS/CTS handshaking method is applied and may include a detecting unit 1010 and a setting unit 1020.

The detecting unit 1010 may detect whether any one of a control packet or a data packet transmitted from a sender or a receiver is received.

The detecting unit 1010 may detect whether the received packet is an RTS packet, a CTS packet, or a data packet. Of course, the detecting unit 1010 may detect an NAV value to be set from the received packet.

If it is detected that any one of the control packet or the data packet is received by the detecting unit 1010, the setting unit 1020 may set an NAV only during a predetermined packet transmission period subsequent to the received packet.

For example, if the received packet is the RTS packet, the setting unit 1020 may set an NAV only during a CTS packet transmission period. If the received packet is the CTS packet, the setting unit 1020 may set an NAV only during a data packet transmission period. If the received packet is the data packet, the setting unit 1020 may set an NAV only during an ACK packet transmission period.

In this case, the setting unit 1020 may set an NAV only during a corresponding transmission period using an NAV value included in the received packet and may set an NAV value only during the corresponding transmission period using a predetermined period and a predetermined NAV value based on a type of the received packet.

If the terminal 1000 is located within a communication range of a control packet of a sender which transmits an RTS packet or a communication range of a data packet of the sender which transmits a data packet, the setting unit 1020 may set an NAV during a subsequent packet transmission period. If the terminal 1000 is located within a communication range of a control packet of a receiver which transmits a CTS packet, the setting unit 1020 may set an NAV during a subsequent packet transmission period.

MODE FOR INVENTION

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

The invention claimed is:

1. A terminal comprising a detecting unit and a setting unit, said detecting unit comprising detecting unit circuitry configured to detect whether one or more control and/or data packets is received, and said setting unit comprising setting unit circuitry configured to, if the one or more control and/or data packets is received, set a network allocation vector (NAV) only during a packet transmission period subsequent to the receiving of the one or more control and/or data packets, wherein the setting of the NAV comprises:

the setting unit circuitry setting a first NAV only during a clear to send (CTS) packet transmission period, only if the terminal is within a control communication range of a sender of a ready to send (RTS) packet and the detecting unit circuitry detects that the one or more control and/or data packets comprises the RTS packet;

the setting unit circuitry setting a second NAV only during a data packet transmission period, only if the terminal is within a control communication range of a sender of a CTS packet and the detecting unit circuitry detects that the one or more control and/or data packets comprises the CTS packet; and the setting unit circuitry setting a third NAV only during an acknowledge (ACK) packet transmission period, only if the terminal is within a data communication range of the sender of the RTS packet and the detecting unit circuitry detects that the one or more control and/or data packets comprises a data packet sent by the sender of the RTS packet;

wherein the terminal is configured such that if the terminal is not within the control communication range of the sender of the CTS packet, the setting unit circuitry refrains from setting the second NAV during the data transmission period, and is further configured such that if the terminal is not within the data communication range of the sender of the RTS packet, the setting unit circuitry refrains from setting the third NAV during the acknowledge (ACK) packet transmission period.

2. The terminal of claim 1, wherein the terminal is portable.

* * * * *